Dec. 13, 1938.                    R. LEE                    2,140,364
                        RADIO FREQUENCY WATTMETER
                          Filed Oct. 16, 1936
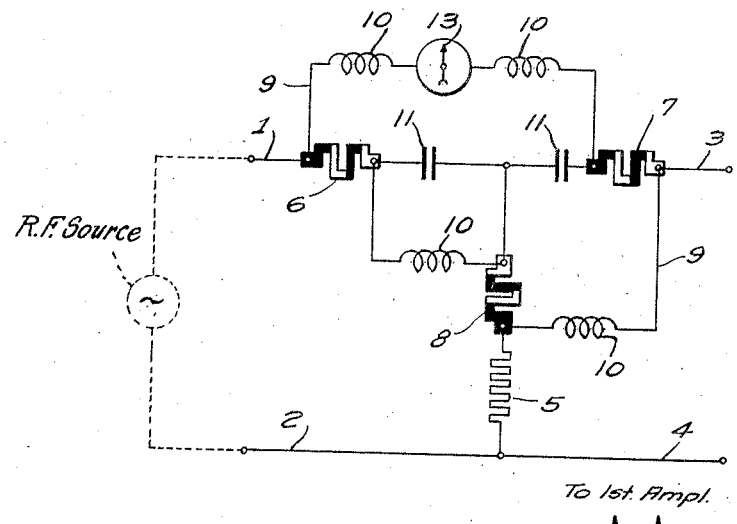
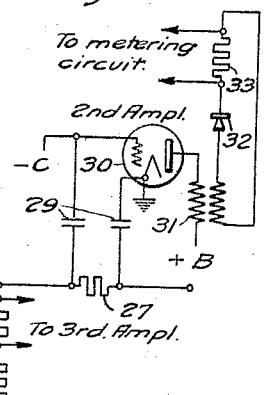
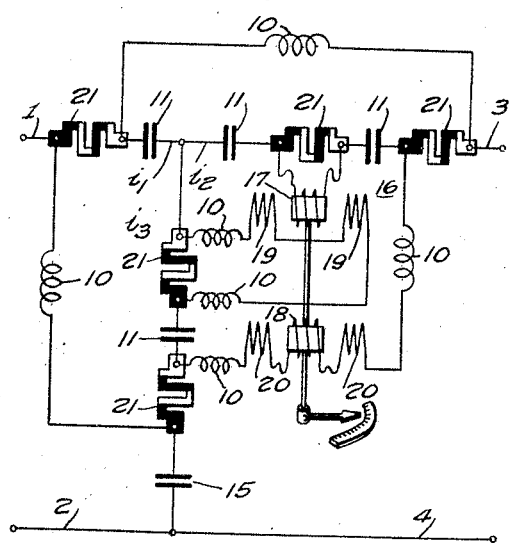
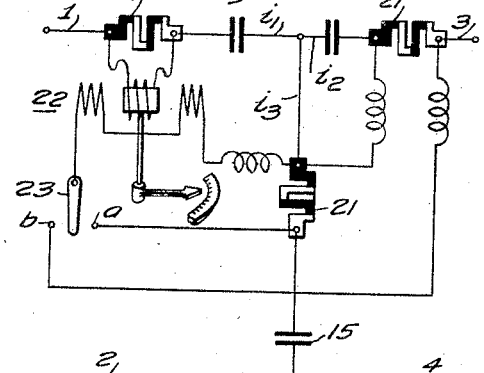
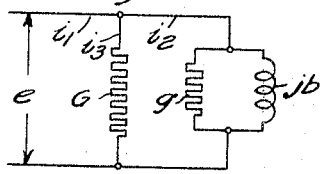
WITNESSES:
C. A. McCloskey
Wm. C. Groome
INVENTOR
Reuben Lee
BY
ATTORNEY Patented Dec. 13, 1938

2,140,364

UNITED STATES PATENT OFFICE 2,140,364

RADIO FREQUENCY WATTMETER

Reuben Lee, Springfield, Mass., assignor to Westinghouse Electric & Manufacturing Company, East Pittsburgh, Pa., a corporation of Pennsylvania Application October 16, 1936, Serial No. 105,921

5 Claims. (Cl. 171—95)

My invention relates to radio frequency alternating-current measurements and particularly to the measurement of power and energy quantities by direct-reading instruments. The usual forms of direct-reading power and energy responsive instruments are of little value at radio frequencies, principally because of the high reactance effects of comparatively small inductances at such frequencies, and the high admittance effects of relatively small capacitances. The losses in the usual forms of instrument magnetic circuits at high frequencies are also quite large and are variable widely with frequency, so as to interfere with accurate measurements. Because of these difficulties with wattmetric devices at radio frequencies, it has been the practice to obtain power and energy measurements by calculation from readings of more easily measurable quantities.

It is an object of my invention to provide a novel direct-reading instrument for the measurement of power and energy quantities at radio frequencies.

A further object of my invention is to provide a novel direct-reading instrument for the measurement of alternating-current power quantities, in which the alternating-current power quantity being measured is translated to the form of a direct-current and indicated by means of a direct-current galvanometer element.

Other objects of my invention will become evident from the following detailed description taken in conjunction with the accompanying drawing, in which:

Figure 1 is a diagrammatic view of a radio frequency wattmeter embodying my invention;

Fig. 2 is a diagrammatic view of a modification of the wattmeter shown in Fig. 1;

Fig. 3 is a diagrammatic view of a simplified form of the wattmeter shown in Fig. 2, suitable for use with tuned load circuits, Fig. 4 is a simplified impedance diagram of the circuit shown in Fig. 1; and, Fig. 5 is a fragmentary diagrammatic view showing an embodiment of the invention employing vacuum tubes in place of the thermocouples of Figs. 1 to 3.

Referring to Fig. 1, the instrument includes an input circuit indicated by the conductors 1 and 2, to be connected to a radio-frequency source; and an output circuit indicated by the conductors 3 and 4, to be connected to the load whose power consumption is to be measured. Impedance 5 is connected to constitute a shunt circuit in parallel to the load circuit 3, 4, to draw a current in phase with the voltage impressed on the load circuit, for a purpose which will hereinafter appear.

A thermocouple 6 is connected in the input circuit 1, 2 so as to be traversed by the total current supplied from the source (not shown) to the load and to the shunt 5, and two other thermocouples 7 and 8 are connected in the output circuit 3, 4 and in the shunt circuit constituted by the impedance 5, respectively.

The three thermocouples 6, 7 and 8 are serially connected in a direct-current circuit 9 in such relative directions that the electromotive forces developed by the thermocouples 7 and 8 add, and the electromotive force developed by the thermocouple 6 acts in the opposite direction to the electromotive forces of the thermocouples 7 and 8.

A plurality of radio frequency choke coils 10 are included at convenient points in the direct current circuit 9, to prevent the flow of radio frequency currents therein. Similarly, a pair of blocking condensers 11 are included between the shunt 5 and the thermocouples 6 and 7, respectively, for the purpose of preventing the flow of direct current in the input circuit 1, 2, and the output circuit 3, 4.

A direct-current instrument 13, having a uniform scale calibrated in watts, is connected in the direct-current circuit 9 at any convenient point. The instrument 13 may be of the d'Arsonval, or other suitable type, such as to provide an open-scale deflection dependent upon current, throughout the range of the instrument. Although the instrument 13 responds to current only, and has no voltage connection, its reading may be taken as a measure of the high-frequency power flow (watts) supplied to the output circuit 3, 4, because of proportionality between the direct current supplied to its terminals and the high-frequency power supplied to the output circuit 3, 4, as will hereinafter be explained.

The thermocouples 6, 7 and 8 are of similar dimensions and characteristics; the design being such as to provide relatively small heat storage capacity and to produce an electromotive force proportional to the square of the current traversing the thermocouple junctions.

The operation of the apparatus shown in Fig. 1 may be set forth as follows: Upon connecting the load (not shown) in the output circuit 3, 4, and connecting the input circuit 1, 2 to a suitable constant-voltage source of radio frequency current, a load current circulates through the load, and a shunt current also traverses the shunt 5. The currents circulating through the thermocouples 6, 7 and 8, generate heat in the latter, and electromotive forces proportional to the squares of the respective currents are produced in the direct-current circuit 9. The electromotive forces in the direct-current circuit 9 are added as scalar quantities and produce a deflection of the instrument 13 proportional to the scalar difference between the square of the source current and the sum of the squares of the load and shunt currents. That this scalar difference is proportional to the real power flow to the load circuit may be shown as follows:

Let $w$ = reading of the instrument 13.
$i_1$ = source current, supplied from high-frequency source to input terminals 1 and 2.
$i_2$ = load current, traversing output terminals 3 and 4.
$i_3$ = shunt current, traversing shunt 5.
$e$ = radio-frequency voltage of source.
$R$ = resistance of shunt 5.
$G$ = conductance of shunt element $5 = \frac{1}{R}$
$g$ = conductance of the load.
$b$ = susceptance of the load.
$j$ = the imaginary quantity $\sqrt{-1}$.

It is assumed that the impedance of the thermocouples 6, 7 and 8 is negligible as compared to that of the shunt 5 and the load. Under this assumption, the alternating-current circuit of Fig. 1 may be shown in simplified form as that of Fig. 4.

The source current is the sum of the shunt and load currents:

$$i_1 = i_2 + i_3 \quad (1)$$

The load current is $$i_2 = e(g - jb) \quad (2)$$

The shunt current is $$i_3 = eG \quad (3)$$

Substituting (2) and (3) in (1)

$$i_1 = e(g - jb) + eG = e(g + G - jb) \quad (4)$$

The quantity measured by the instrument 13 is $$w = \frac{(i_1^2 - i_2^2 - i_3^2)R}{2} \quad (5)$$

(Where the squared quantities are scalars as distinguished from vector quantities.)

Substituting (2), (3) and (4), in (5), noting that all squared quadrature quantities become real and positive when treated as scalars:

$$w = \frac{e^2((g+G)^2 + b^2)R - e^2(g^2+b^2)R - e^2G^2R}{2}$$

$$= \frac{2e^2gGR}{2} = e^2g \quad (6)$$

The quantity $e^2g$ represents the real power flow produced by a voltage $e$ applied to any admittance having a conductance component $g$, as is well understood in the art.

For satisfactory operation of the circuit of Fig. 1, it is necessary that the shunt circuit through the impedance 5 have zero power factor angle for the frequency of the source. A pure resistance circuit is preferable, but cannot ordinarily be attained in practice, and it is desirable to balance out any positive or negative reactive impedance component in the shunt by a reactance component of opposite sign. In extreme cases, it may be impractical to obtain a resistive impedance effect, and in such cases I may use a capacitive shunt, as indicated in Fig. 2. The circuit of Fig. 2 may also be used in cases where the power flow to the load is heavy, as the circuit of Fig. 1 requires a power loss in the shunt 5 comparable with the total power flow to the load for maximum accuracy of measurement.

In Fig. 2, the shunt impedance 5 (of Fig. 1) is replaced by a capacitive reactance represented by a condenser 15, and the d'Arsonval or equivalent instrument is replaced by a dynamometer type instrument 16. The instrument 16 preferably comprises two moving coils 17 and 18, on a common shaft, each moving coil being separately subject to the field produced by a pair of stationary coils 19 and 20, respectively.

The instrument 16 is provided with a non-uniform scale and is so designed that with equal currents in the upper and lower stationary coils 19 and 20, a given value of current in the moving coils 17 and 18 will produce four times as great a torque in the upper element 17, 19 as in the lower element 18, 20. The coils of the instrument 16 are connected in such relative directions that the torques of the upper and lower elements oppose.

A plurality of radio frequency choke coils 10 and blocking condensers 11 are provided for the same purposes as in Fig. 1.

A plurality of thermocouples 21 are provided and connected to the coils 17, 18, 19 and 20 in such relative directions that the reading of instrument 16 represents the quantity $$w = \frac{X_c}{2}\sqrt{4i_2^2 i_3^2 - (i_1^2 - i_2^2 - i_3^2)^2}$$

where $X_c$ denotes the capacitive reactance of the shunt circuit through condenser 15 at the frequency of the source.

It may be shown by means of an analysis similar to that given in connection with Fig. 1, that the reading of instrument 16 of Fig. 2 is proportional to the real power flow to the load.

In some applications, the load circuit whose power consumption is to be measured is tuned to the frequency of the source. In such applications, the circuit of Fig. 2 can be simplified to that shown in Fig. 3.

In Fig. 3, a single element dynamometer-type instrument 22 is utilized, and a switch 23 is provided for transferring connections of the stationary coils of the instrument 22 so that they may be energized in accordance with either the shunt current or the load current. The remaining elements of Fig. 3 may be readily identified with the corresponding elements of Fig. 2 and require no description.

The operation of the apparatus shown in Fig. 3 is as follows: For measuring a capacitively tuned load, the switch 23 is moved to position $a$, and the instrument deflection is $$w = X_c i_3 i_1$$

In the case of inductively tuned loads, the switch 23 is moved to position $b$ and the instrument reading becomes $$w = X_c i_2 i_1$$

In either case the reading is a measure of true power supplied to the load.

Fig 5 shows an application of the invention utilizing electronic apparatus in place of the thermocouples of Figs. 1 to 3. In Fig. 5, resistors 26, 27 and 28 are connected in the circuit, the locations corresponding to the positions of the thermocouples 6, 7 and 8 of Fig. 1, respectively. The resistors 26, 27 and 28 are connected through coupling capacitors 29 to the input circuits of three amplifiers, one of which is shown at 30; the remaining two, and associated coupling capacitors, being omitted for simplicity. Although shown as a single amplifier tube, the amplifier 30 may obviously be of any suitable multistage type known in the art. The amplifier 30 is designed and operated so that its radio frequency output is proportional to the square of its radio frequency input, in a manner well-understood in the art. A radio frequency transformer 31 is included in the output circuit of the amplifier 30, and the secondary coil of the transformer 31 is connected through a rectifier 32 to a resistor 33. With this arrangement, a direct-current voltage drop proportional to the square of the radio frequency current in the resistor 27 appears across the resistor 33. As the resistor 33 and the corresponding resistors (not shown) of the other two branch circuits are insulated from one another, they may be connected in any desired additive or substractive relationship to a metering device. For the circuit shown, these resistors are connected to the metering device (not shown) so that the reading of the latter is $$w = \frac{(i_1^2 - i_2^2 - i_3^2)R}{2}$$

as in Fig. 1.

The circuits of Figs. 2 and 3 may similarly be set up with electronic apparatus in place of thermocouples, as will be obvious.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In apparatus for measuring a high-frequency alternating-current power quantity supplied from an input circuit through an output circuit to a load, a shunt circuit connected to said input circuit in parallel relation to said output circuit, means for deriving from said input circuit a first unidirectional electrical energization proportional to the square of the current in said input circuit, means for deriving from said output circuit a second unidirectional electrical energization proportional to the square of the current in said output circuit, means for deriving from said shunt circuit a third unidirectional electrical energization proportional to the square of the current in said shunt circuit, electroresponsive measuring means responsive to the scalar difference of said first energization and the sum of said second and third energizations, and means for preventing flow of high frequency alternating currents from said input circuit to said measuring means.

2. In apparatus for measuring a high-frequency alternating-current power quantity supplied from an input circuit through an output circuit to a load, a shunt circuit connected to said input circuit in parallel relation to said output circuit, thermocouple means connected in said input circuit for deriving therefrom a first unidirectional electrical energization proportional to the square of the current in said input circuit, thermocouple means connected in said output circuit for deriving therefrom a second unidirectional electrical energization proportional to the square of the current in said output circuit, thermocouple means connected in said shunt circuit for deriving therefrom a third unidirectional electrical energization proportional to the square of the current in said shunt circuit, a direct-current circuit connecting said thermocouples in such relative directions that said first energization is opposed by said second and third energizations, a galvanometer element included in said direct-current circuit, choke coil means connected in said direct-current circuit for preventing the flow of radio frequency current therein, and blocking condenser means included in said output circuit for preventing the flow of direct-current therein.

3. In apparatus for measuring a high-frequency alternating-current power quantity supplied from an input circuit through an output circuit to a load, a shunt circuit connected to said input circuit in parallel relation to said output circuit, said shunt circuit having capacitive reactance $X_c$, a first means for deriving from said input circuit unidirectional electrical energization proportional to the square of the current $i_1$ in said input circuit, a second means for deriving from said output circuit unidirectional electrical energization proportional to the square of the current $i_2$ in said output circuit, a third means for deriving from said shunt circuit unidirectional electrical energization proportional to the square of the current $i_3$ in said shunt circuit, and electroresponsive measuring means comprising a pair of opposing measuring elements, one of said elements being connected to said second and third means to produce an effect proportional to $4i_2^2 i_3^2$ and the remaining element being connected to said first, second and third means to produce an effect proportional to $(i_1^2 - i_2^2 - i_3^2)^2$ whereby the electroresponsive means may give a reading $$w = \frac{X_c}{2}\sqrt{4i_2^2 i_3^2 - (i_1^2 - i_2^2 - i_3^2)^2}.$$

4. In apparatus for measuring a high-frequency alternating-current power quantity supplied from an input circuit through an output circuit to a load, a shunt circuit connected to said input circuit in parallel relation to said output circuit, means for deriving from said input circuit a first unidirectional current proportional to the square of the current in said input circuit, means for deriving from said output circuit a second unidirectional current proportional to the square of the current in said output circuit, means for deriving from said shunt circuit a third unidirectional current proportional to the square of the current in said shunt circuit, a measuring circuit containing said three means in series with the first means opposed to said second and third means, an electroresponsive measuring device in said measuring circuit, and means for preventing the flow of alternating current to said measuring device.

5. In apparatus for measuring a high-frequency alternating-current power quantity supplied from an input circuit through an output circuit to a load, a shunt circuit connected to said input circuit in parallel relation to said output circuit, means for deriving from said input circuit a first unidirectional current proportional to the square of the current in said input circuit, means for deriving from said output circuit a second unidirectional current proportional to the square of the current in said output circuit, means for deriving from said shunt circuit a third unidirectional current proportional to the square of the current in said shunt circuit, a measuring circuit containing said three means in series with the first means opposed to said second and third means, an electroresponsive measuring device in said measuring circuit, direct current blocking means in said alternating current circuits, and means for preventing the flow of alternating current to said measuring device.

REUBEN LEE.